US012691378B2

(12) United States Patent
Carson et al.

(10) Patent No.: US 12,691,378 B2
(45) Date of Patent: Jul. 28, 2026

(54) TEXT EXTRACTION TO SEPARATE ENCODING OF TEXT AND IMAGES FOR STREAMING DURING PERIODS OF LOW CONNECTIVITY

(71) Applicant: Sony Interactive Entertainment Inc., Tokyo (JP)

(72) Inventors: Jay Alan Carson, Foster City, CA (US); Mario M. Sarria, Jr., San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 240 days.

(21) Appl. No.: 18/105,161

(22) Filed: Feb. 2, 2023

(65) Prior Publication Data

US 2024/0261678 A1     Aug. 8, 2024

(51) Int. Cl.
| | |
|---|---|
| *A63F 13/52* | (2014.01) |
| *A63F 13/355* | (2014.01) |
| *G06T 9/00* | (2006.01) |
| *G06T 11/60* | (2026.01) |
| *G06T 15/00* | (2011.01) |

(52) U.S. Cl.
CPC ............ *A63F 13/52* (2014.09); *A63F 13/355* (2014.09); *G06T 9/00* (2013.01); *G06T 11/60* (2013.01); *G06T 15/005* (2013.01); *G06T 2200/24* (2013.01)

(58) Field of Classification Search
CPC .......... A63F 13/52; A63F 13/355; G06T 9/00; G06T 11/60; G06T 15/005
See application file for complete search history.

(56) References Cited

U.S. PATENT DOCUMENTS

| | | | |
|---|---|---|---|
| 10,062,181 B1 * | 8/2018 | Longhurst | G06T 7/13 |
| 10,537,799 B1 * | 1/2020 | Burke | G06T 15/205 |
| 2009/0190473 A1 * | 7/2009 | Gassewitz | H04L 43/00 |
| | | | 370/235 |
| 2018/0189402 A1 * | 7/2018 | Mullaney | G06Q 50/01 |
| 2021/0146240 A1 | 5/2021 | Colenbrander | |
| 2022/0134227 A1 | 5/2022 | Vining et al. | |

OTHER PUBLICATIONS

ISR WO PCT/US2024/012994, dated May 8, 2024, Total 11 pages.

* cited by examiner

*Primary Examiner* — Yingchuan Zhang
(74) *Attorney, Agent, or Firm* — Kilpatrick Townsend & Stockton LLP

(57) ABSTRACT

A method including executing a video game on a server to generate draw calls for execution by one or more graphics processing units to render an image frame. The method including a first set of commands of one or more draw calls that are used to render text in the image frame. The method including identifying a second set of commands of one or more draw calls that are used to render a scene in the image frame. The method including executing the first set of commands to render the text. The method including executing the second set of commands to render the scene independent of rendering the text. The method including generating an encoded scene by encoding the rendered scene. The method including separately streaming to a client device the text and the encoded scene.

20 Claims, 7 Drawing Sheets

<u>200</u>

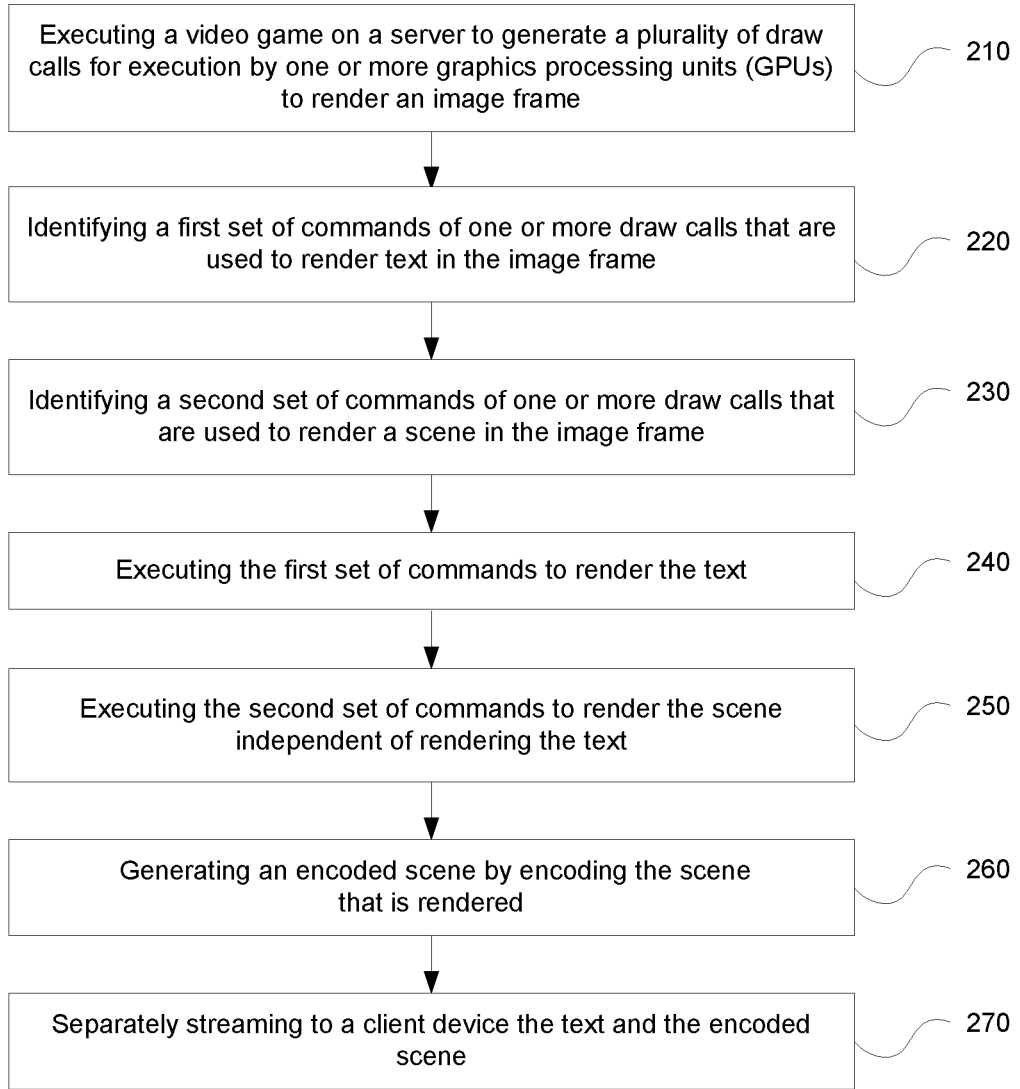

Executing a video game on a server to generate a plurality of draw calls for execution by one or more graphics processing units (GPUs) to render an image frame    210

Identifying a first set of commands of one or more draw calls that are used to render text in the image frame    220

Identifying a second set of commands of one or more draw calls that are used to render a scene in the image frame    230

Executing the first set of commands to render the text    240

Executing the second set of commands to render the scene independent of rendering the text    250

Generating an encoded scene by encoding the scene that is rendered    260

Separately streaming to a client device the text and the encoded scene    270

TEXT EXTRACTION TO SEPARATE ENCODING OF TEXT AND IMAGES FOR STREAMING DURING PERIODS OF LOW CONNECTIVITY

TECHNICAL FIELD

The present disclosure is related to gaming, and more specifically to the separation of text and image information (e.g., background scene) presented for rendering for separate processing by the graphics processors and encoders, such that during low periods of connectivity between a server and client device (e.g., game streaming services) the text information may be delivered with little or no compression while the image information may undergo additional compression to meet the lower bandwidth. Also, artificial intelligence models can be built to identify which commands in the command buffers are for rendering text and which commands are for rendering images. In addition, separation of the text information provides for more directed operations using artificial intelligence to the text information or the image information.

BACKGROUND OF THE DISCLOSURE

Video games and/or gaming applications and their related industries (e.g., video gaming) are extremely popular and represent a large percentage of the worldwide entertainment market. Video games are played anywhere and at any time using various types of platforms, including gaming consoles, desktop or laptop computers, mobile phones, etc.

Video gaming may be streamed from a back-end server, such as in a cloud gaming configuration where the video game is being executed at the back-end server and game play of the video game is streamed to a client device over a network. During the game play of a video game, in addition to the background scene that is presented as a sequence of image frames, there may be a user interface providing useful information, or game generated text, or other text that is inserted and/or overlaid the background scene. In that manner, the player is able to receive information presented in various formats other than audio that is related to the game play of the video game. For example, players that are hearing impaired rely on the closed captioning when playing a video game. In other examples, many players actively shut off audio and play a video game with only closed captioning because of various reasons, such as less distractions, quicker understanding of the game environment, etc.

During periods of low connectivity between the back-end server and the client device, increased compression is performed on the data being transferred to the client device. That information includes the image frames, the user interface, and/or the text provided in the user interface. That is, compression is performed on all the data. On the one hand, reduced resolution of the image frames for a period of time due to increased compression generally does not diminish the player experience, because generally the story line and the action being presented during the game play remains unaffected. However, on the other hand, reduced resolution of text, in particular, may be detrimental to the player experience because the player may be unable to decipher the text. As such, the information provided through the text is compressed so much during periods of low connectivity that the information is useless to the player.

It is in this context that embodiments of the disclosure arise.

SUMMARY

Embodiments of the present disclosure relate to the extraction of text from a render pipeline to separate rendering of text and rendering of a scene in an image frame, wherein the rendered scene is encoded, wherein the raw text and the encoded scene are streamed separately to a client device, such that the text is streamed at a higher resolution than if the text were encoded with the scene especially when experiencing low connectivity between a server and a client device. Also, an artificial intelligence model can be built to identify which commands in the command buffers are for rendering text and which commands are for rendering images. Separation of the text information provides for more isolated operations using artificial intelligence that are directed solely to the text information or to the image information.

In one embodiment, a method is disclosed. The method including executing a video game on a server to generate a plurality of draw calls for execution by one or more graphics processing units (GPUs) to render an image frame. The method including identifying a first set of commands of one or more draw calls that are used to render text in the image frame. The method including identifying a second set of commands of one or more draw calls that are used to render a scene in the image frame. The method including executing the first set of commands to render the text. The method including executing the second set of commands to render the scene independent of rendering the text. The method including generating an encoded scene by encoding the scene that is rendered. The method including separately streaming to a client device the text and the encoded scene.

In another embodiment, a non-transitory computer-readable medium storing a computer program for implementing a method is disclosed. The computer-readable medium including program instructions for executing a video game on a server to generate a plurality of draw calls for execution by one or more graphics processing units (GPUs) to render an image frame. The computer-readable medium including program instructions for identifying a first set of commands of one or more draw calls that are used to render text in the image frame. The computer-readable medium including program instructions for identifying a second set of commands of one or more draw calls that are used to render a scene in the image frame. The computer-readable medium including program instructions for executing the first set of commands to render the text. The computer-readable medium including program instructions for executing the second set of commands to render the scene independent of rendering the text. The computer-readable medium including program instructions for generating an encoded scene by encoding the scene that is rendered. The computer-readable medium including program instructions for separately streaming to a client device the text and the encoded scene.

In still another embodiment, a computer system is disclosed, wherein the computer system includes a processor and memory coupled to the processor and having stored therein instructions that, if executed by the computer system, cause the computer system to execute a method. The method including executing a video game on a server to generate a plurality of draw calls for execution by one or more graphics processing units (GPUs) to render an image frame. The method including a first set of commands of one or more draw calls that are used to render text in the image frame. The method including identifying a second set of commands of one or more draw calls that are used to render a scene in the image frame. The method including executing the first set of commands to render the text. The method including executing the second set of commands to render the scene independent of rendering the text. The method including generating an encoded scene by encoding the scene that is rendered. The method including separately streaming to a client device the text and the encoded scene.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIG. 2 is a flow diagram illustrating a method for extracting text from a rendering pipeline configured for generating a sequence of images of a scene in order to separately encode text and images during periods of low network connectivity, in accordance with one embodiment of the present disclosure.

DETAILED DESCRIPTION

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods providing for the extraction of text from a rendering pipeline configured for generating images of a scene that includes one or more objects. The text may be overlayed one or more of the images, and may be further included within a user interface that is overlayed the one or more images. Extraction of text from the images of the scene is useful during periods of low network connectivity. For example, the text and an image including one or more objects can be separately rendered, wherein the image may be encoded while the text is unencoded (i.e., raw) in preparation of streaming to a client device. In that manner and as an advantage, while the image may be streamed using higher compression to accommodate for lower network connectivity, the text is streamed at high resolution so that the user can fully understand the text even though the image may be of low resolution during the same period of lower network connectivity. Also, artificial intelligence (AI) techniques may be implemented to build AI models identifying draw commands generated by a CPU in order to separate draw commands for text and/or overlays from draw command for a corresponding image and/or objects of the image. As a further advantage, the separation of the text information provides for more isolated operations using additional artificial intelligence processes that are directed solely to the text information or to the image information.

Throughout the specification, the reference to "game" or "video game" or "gaming application" is meant to represent any type of interactive application that is directed through execution of input commands. For illustration purposes only, an interactive application includes applications for gaming, word processing, video processing, video game processing, etc. Also, the terms "virtual world" or "virtual environment" or "metaverse" is meant to represent any type of environment generated by a corresponding application or applications for interaction between a plurality of users in a multi-player session or multi-player gaming session. Further, the terms introduced above are interchangeable.

With the above general understanding of the various embodiments, example details of the embodiments will now be described with reference to the various drawings.

Figure 1:
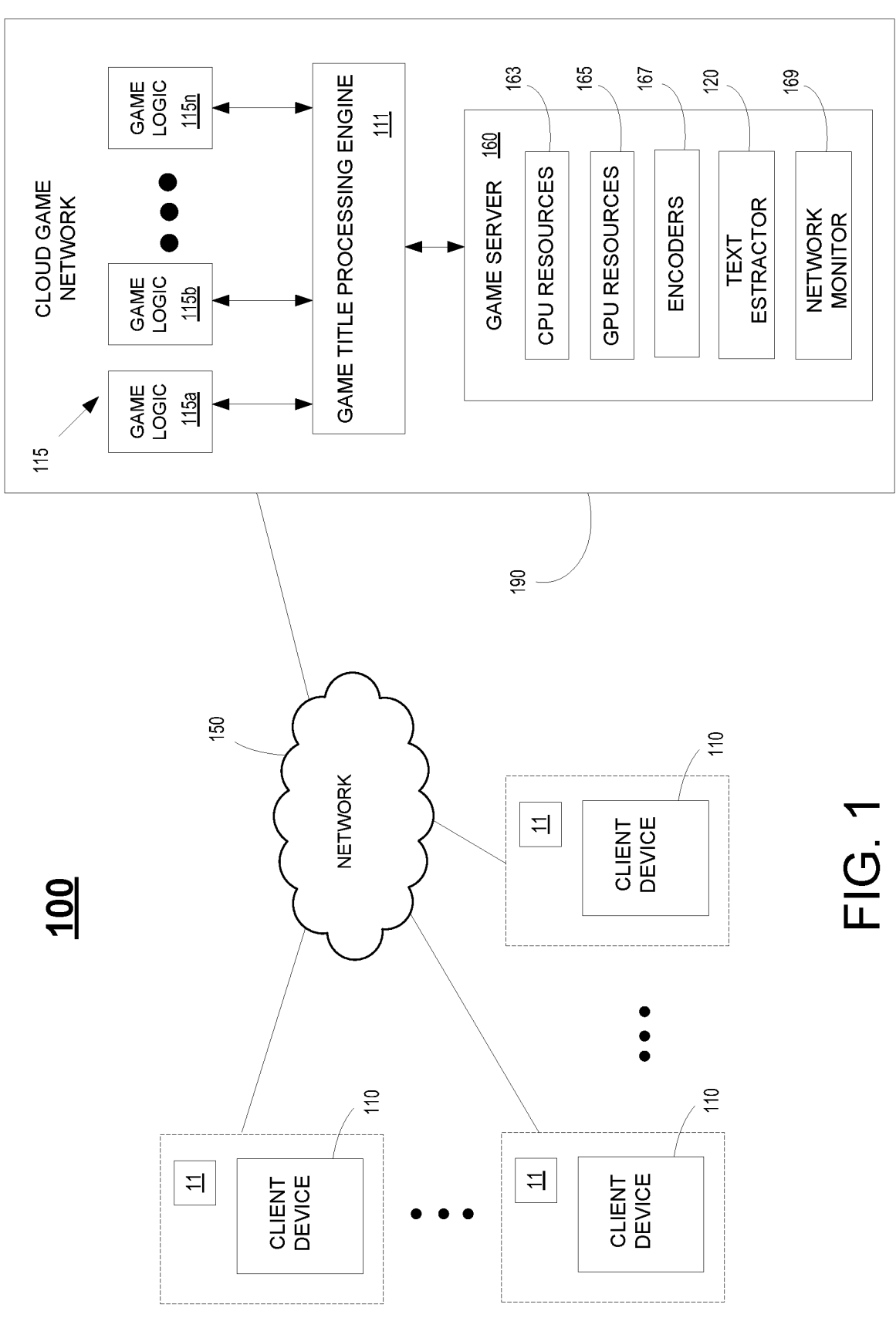
FIG. 1 illustrates a system including a text parser configured for the extraction of text from a rendering pipeline used for generating images and text that may be included within overlays, in accordance with one embodiment of the disclosure.

FIG. 1 is a diagram of a system 100 for extracting text from a rendering pipeline, wherein the text is separately rendered from a corresponding image and/or objects of the image so that encoding processes for the text and the image can be separately treated during periods of low network connectivity, in accordance with one embodiment of the disclosure. In that manner, the image may be more compressed while the text remains uncompressed when streaming the information to a client device so that there is no loss in the information communicated in the text.

In one embodiment, the system 100 is configured to provide gaming over a network between one or more cloud gaming servers. Cloud gaming includes the execution of a video game at the server to generate game rendered video frames, which are then sent to a client for display. Although embodiments of the present disclosure are described for extracting text when streaming content for cloud gaming, it is understood that the extraction of text and/or overlay information from image information, including objects of the image, could be performed when streaming any information including text, such as when streaming video content (e.g., movies, etc.) that includes text and/or overlays with text information.

FIG. 1 illustrates the implementation of multiple graphics processing units (GPUs) when processing an application, wherein a number of GPUs collaborate to process an image or data. It is also understood that the multi-GPU execution may be performed using physical GPUs, or virtual GPUs, or a combination of both, in various embodiments. For example, virtual machines (e.g. instances) may be created using a hypervisor of a host hardware (e.g. located at a data center) utilizing one or more components of a hardware layer, such as multiple CPUs, memory modules, GPUs, network interfaces, communication components, etc. These physical resources may be arranged in racks, such as racks of CPUs, racks of GPUs, racks of memory, etc., wherein the physical resources in the racks may be accessed using top of rack switches facilitating a fabric for assembling and accessing of components used for an instance (e.g. when building the virtualized components of the instance). Generally, a hypervisor can present multiple guest operating systems of multiple instances that are configured with virtual resources. That is, each of the operating systems may be configured with a corresponding set of virtualized resources supported by one or more hardware resources (e.g. located at a corresponding data center). For instance, each operating system may be supported with a virtual CPU, multiple virtual GPUs, virtual memory, virtualized communication components, etc.

System 100 provides gaming via a cloud game network 190, wherein the game is being executed remote from client device 110 (e.g. thin client) of a corresponding user that is playing the game, in accordance with one embodiment of the present disclosure. System 100 may provide gaming control to one or more users playing one or more games through the cloud game network 190 via network 150 in either single-player or multi-player modes. In some embodiments, the cloud game network 190 may include a plurality of virtual machines (VMs) running on a hypervisor of a host machine, with one or more virtual machines configured to execute a game processor module utilizing the hardware resources available to the hypervisor of the host. Network 150 may include one or more communication technologies. In some embodiments, network 150 may include 5<sup>th</sup> Generation (5G) network technology having advanced wireless communication systems.

As shown, the cloud game network 190 includes a game server 160 that provides access to a plurality of video games. Game server 160 may be any type of server computing device available in the cloud, and may be configured as one or more virtual machines executing on one or more hosts. For example, game server 160 may manage a virtual machine supporting a game processor that instantiates an instance of a game for a user. As such, a plurality of game processors of game server 160 associated with a plurality of virtual machines is configured to execute multiple instances of one or more games associated with gameplays of a plurality of users. In that manner, back-end server support provides streaming of media (e.g. video, audio, etc.) of gameplays of a plurality of gaming applications to a plurality of corresponding users. That is, game server 160 is configured to stream data (e.g. rendered images and/or frames of a corresponding gameplay) back to a corresponding client device 110 through network 150. In that manner, a computationally complex gaming application may be executing at the back-end server in response to controller inputs received and forwarded by client device 110. Each server is able to render images and/or frames that are then encoded (e.g. compressed) and streamed to the corresponding client device for display.

For example, a plurality of users may access cloud game network 190 via communication network 150 using corresponding client devices 110 configured for receiving streaming media. In one embodiment, client device 110 may be configured as a thin client providing interfacing with a back end server (e.g. cloud game network 190) configured for providing computational functionality (e.g. including game title processing engine 111). In another embodiment, client device 110 may be configured with a game title processing engine and game logic for at least some local processing of a video game, and may be further utilized for receiving streaming content as generated by the video game executing at a back-end server, or for other content provided by back-end server support. For local processing, the game title processing engine includes basic processor based functions for executing a video game and services associated with the video game. In that case, the game logic may be stored on the local client device 110 and is used for executing the video game.

Each of the client devices 110 may be requesting access to different games from the cloud game network. For example, cloud game network 190 may be executing one or more game logics that are built upon a game title processing engine 111, as executed using the CPU resources 163 and GPU resources 165 of the game server 160. For instance, game logic 115a in cooperation with game title processing engine 111 may be executing on game server 160 for one client, game logic 115b in cooperation with game title processing engine 111 may be executing on game server 160 for a second client, and game logic 115n in cooperation with game title processing engine 111 may be executing on game server 160 for an Nth client.

In particular, client device 110 of a corresponding user (not shown) is configured for requesting access to games over a communication network 150, such as the internet, and for rendering for display images generated by a video game executed by the game server 160, wherein encoded images generated by the encoders 167 (i.e., via compression of one or more images) are delivered to the client device 110 for display in association with the corresponding user. For example, the user may be interacting through client device 110 with an instance of a video game executing on game processor of game server 160. More particularly, an instance of the video game is executed by the game title processing engine 111. Corresponding game logic (e.g. executable code) 115 implementing the video game is stored and accessible through a data store (not shown), and is used to execute the video game. Game title processing engine 111 is able to support a plurality of video games using a plurality of game logics (e.g. gaming application), each of which is selectable by the user.

For example, client device 110 is configured to interact with the game title processing engine 111 in association with the gameplay of a corresponding user, such as through input commands that are used to drive gameplay. In particular, client device 110 may receive input from various types of input devices, such as game controllers, tablet computers, keyboards, gestures captured by video cameras, mice, touch pads, etc. Client device 110 can be any type of computing device having at least a memory and a processor module that is capable of connecting to the game server 160 over network 150. The back-end game title processing engine 111 is configured for generating rendered images, which is delivered over network 150 for display at a corresponding display in association with client device 110. For example, through cloud based services the game rendered images may be delivered by an instance of a corresponding game (e.g. game logic) executing on game executing engine 111 of game server 160. That is, client device 110 is configured for receiving encoded images (e.g. encoded from game rendered images generated through execution of a video game), and for displaying the images that are rendered on display 11. In one embodiment, display 11 includes an HMD (e.g. displaying VR content). In some embodiments, the rendered images may be streamed to a smartphone or tablet, wirelessly or wired, direct from the cloud based services or via the client device 110 (e.g. PlayStation® Remote Play).

In one embodiment, game server 160 and/or the game title processing engine 111 includes basic processor based functions for executing the game and services associated with the gaming application. For example, game server 160 includes central processing unit (CPU) resources 163 and graphics processing unit (GPU) resources 165 that are configured for performing processor based functions include 2D or 3D rendering, physics simulation, scripting, audio, animation, graphics processing, lighting, shading, rasterization, ray tracing, shadowing, culling, transformation, artificial intelligence, etc. In addition, the CPU and GPU group may implement services for the gaming application, including, in part, memory management, multi-thread management, quality of service (QoS), bandwidth testing, social networking, management of social friends, communication with social networks of friends, communication channels, texting, instant messaging, chat support, etc. In one embodiment, one or more applications share a particular GPU resource. In one embodiment, multiple GPU devices may be combined to perform graphics processing for a single application that is executing on a corresponding CPU.

In addition, system 100 includes a text extractor 120 that is configured for the extraction of text from a render pipeline in order to separate the rendering of text and the rendering of an image (e.g., objects of a scene generated through execution of a video game). Network monitor 169 is configured to perform quality of service (QoS) monitoring between the game server and the corresponding client device. As such, network monitor 169 is able to detect and/or predict when the network connection between the server and the client device is performing poorly, or is below a threshold metric, and trigger a text extraction mode accordingly. In addition, the network monitor 169 is configured to determine when the network connectivity is back to normal, or above a threshold metric, and terminate the text extraction mode, such that encoding of text and the image and/or objects of the image occurs normally (i.e., encode both the text and the image together). Specifically, during periods of low network connectivity between the cloud game network 190 and a corresponding client device 110, the image may be encoded at higher compression than when experiencing normal network connectivity, and the text may be left unencoded or lightly compressed. In that manner, while the image is received at the client device at low resolution, the text is still received at high resolution so that there is no loss in transferring the information being conveyed by the text.

With the detailed description of the system 100 of FIG. 1, flow diagram 200 of FIG. 2 discloses a method for extracting text from a rendering pipeline configured for generating a sequence of images of a scene in order to separately encode text and images during periods of low network connectivity, in accordance with one embodiment of the present disclosure. The operations performed in the flow diagram may be implemented by one or more of the entities previously described components, and also system 100 described in FIG. 1, including, in part, text extractor 120. Text extraction may be performed during periods of low network connectivity between a cloud gaming server and a client device, so that an image may be encoded at a higher compression (e.g., when favoring smoothness of video, such as when presenting all the image frames of a video sequence) while the text remains unencoded, or lightly encoded, when streaming the data to a client device. In that manner, while the image may be streamed at low resolution, the text is streamed at high resolution, so that the information in the text is fully conveyed.

At 210, the method including executing a video game on a server. For example, a request may be received over a network a request to establish a gaming session (e.g., single player or multi-player session) for a user playing a video game. In the gaming session, an instance of the video game is instantiated at the cloud gaming server, as previously described. In particular, the server strives to generate a game rendered image frame in one or more successive frame periods, and more particularly within one frame period, in embodiments of the present disclosure.

For example, an image frame is generated during execution of the video game, either in response to control information (e.g., input commands of a user) or game logic not driven by control information. More specifically, the CPU generates a plurality of draw calls for execution by one or more GPUs to render an image frame, such as an image including a scene and/or objects of a scene. The draw calls are stored into one or more command buffers as executed by one or more selected GPUs, each implementing a graphics pipeline, or the rendering pipeline.

In addition, the image frame may include text that is rendered, wherein the text conveys information or a message. The text may be formatted in any language, such as providing words using English letters, or words made evolving from pictograms (e.g., Chinese characters, Japanese Kanji, Islamic calligraphy, etc.). The text may be further included within a user interface, wherein the text and/or the overlay including the text are then overlaid onto the image for display to the user at the client device.

One or more GPUs, as scheduled by the CPU or a scheduler, may be implemented to render the image (e.g., scene and/or objects of the scene) and the text. Typically, draw calls may be directed to either the scene or objects of the scene of the image frame, or directed to the text and/or the user interface providing the text. One or more assets that are needed by the draw calls are also loaded into system memory for use by the one or more GPUs to render the image frame. In general, the CPU may write draw calls to one or more command buffers for execution by one or more selected GPUs (i.e., selected by a scheduler), wherein the command buffers are included within system memory, or may be included within a corresponding GPU. That is, the draw calls are entered into the rendering pipeline. Each command buffer is configured for storing the corresponding draw call commands. In addition, corresponding assets are also stored and made available to the GPU executing the draw calls in the command buffer. As such, the CPU writes the commands of the draw call to corresponding command buffer(s) using a GPU API, wherein one or more command buffers may be used to render an image frame. Subsequent video frames are rendered using similarly configured command buffers.

In one embodiment, the network connectivity between the server and a client device receiving a plurality of image frames generated by execution of a video game is monitored. For example, the network connectivity is monitored with respect to a plurality of quality of service (QoS) metrics. In addition, the method includes determining when the network connectivity is poor, or falls below a QoS threshold. Further, the method may include predicting when the network connectivity may fall below the QoS threshold. In that manner, when the network connectivity falls below, or is predicted to fall below the QoS threshold, a text extraction mode may be triggered such that the text and the scene (e.g., objects of a scene) travel along different processing lanes for rendering and/or encoding. In particular, the text from the render pipeline may be extracted for improved remote playback of the text during low network connectivity periods (i.e., at a client device), wherein the text is unencoded (or lightly encoded) and streamed (i.e., transmitted) separately to the client device in order to provide improved rendering and display of the text at the client device at a higher resolution than if the text were normally encoded along with the image (e.g., scene and/or objects of the scene) during periods of low connectivity.

In addition, the method may include determining when the network connectivity returns back to normal (e.g., above the QoS threshold), wherein the text extraction mode may be exited, and the image (e.g., scene and/or objects of the scene) and the text and/or user interfaces including the text are rendered and encoded normally for streaming to the client device.

At 220, during the text extraction mode, the method includes identifying a first set of commands of one or more draw calls that are used to render text in the image frame. The draw calls may be identified before the CPU writes to one or more command buffers for scheduling and execution by one or more selected GPUs. In some implementations, the draw calls may be identified after the CPU writes to command buffers for execution, in which case new command buffers are newly written to separate the rendering processes for text and the scene including objects of the scene.

For example, the text may include information presented in any one of a variety of formats (e.g., English characters, Japanese Kanji, Chinese characters, Islamic calligraphy, etc.). The text may be provided within a user interface. For example, the user interface may provide health information for a character as included within a status interface, or the user interface may include communication provided in a thought bubble, or may include information provided in a chat forum.

The information conveyed in the text may include player status information, health information, game status information, communication from the game as game generated text, communication from other players including chat forums. In some cases, the text is presented as closed-captioning to supplement the game play. For example, some players may be hearing impaired or simply prefer playing without sound for better concentration and quicker awareness of what is going on in the video game.

At 230, during the text extraction mode, the method including identifying a second set of commands of one or more draw calls that are used to render a scene (i.e., an image) or objects of the scene in the image frame. This may be determined passively, as remaining draw calls not identified as text or overlays providing text would be identified as being used to render the scene and/or objects of the scene. In another embodiment, the identification of draw calls used to render a scene and/or objects of the scene is actively determined.

At 240, the method including executing the first set of commands to render the text. During the text extraction rendering mode, the text and the image of a scene including objects of the scene are rendered using separate rendering pipelines. In particular, draw calls for text are identified and sent on one path for storing to one or more corresponding command buffers for execution by one or more GPUs. Draw calls to the image of the scene or objects of the scene of the image frame are sent on another path for storing to other corresponding command buffers for execution by one or more GPUs. As such, the draw calls are entered into the rendering pipeline, and executed by corresponding GPUs to render the text and/or user interfaces including the text for the image frame. That is, the first set of commands is used to render the user interface and the text in combination. The rendered text and/or user interfaces including the text may be placed into a corresponding display or frame buffer. In some implementations, the same GPU may still be used to render the text and/or the image of the scene (and/or objects of the scene), as long as the output data for text can remain separated from the data for the image of the scene and/or objects of the scene.

At 250, the method including executing the second set of commands to render the image of the scene or objects of the scene independent of rendering the text. During the text extraction rendering mode, draw calls for the scene (e.g., image) and/or objects of the scene of the image frame are sent on a different path than draw calls for text for storing to one or more corresponding command buffers for execution by one or more GPUs. As such, the draw calls are entered into the rendering pipeline, and executed by corresponding GPUs to render the scene and/or the objects of the scene for the image frame. The rendered image of the scene and/or the objects of the scene are placed into a corresponding display or frame buffer.

At 260, the method including generating an encoded image by encoding the image of the scene or objects of the scene that is rendered as accessed from the display buffer. In particular, the rendered image of the scene and/or objects of the scene are sent to an encoder for compression. Because the network connectivity is determined to be low, there may be higher compression applied to the data. That is, the rendered image of the scene and/or objects of the scene may be encoded at low resolution, wherein normally the rendered image of the scene and/or objects of the scene would be encoded at high resolution.

More particularly, because the text is extracted and rendered separately from the image of the scene and/or objects of the scene, the rendered text and/or the user interface including the text may remain in a raw format and is not encoded by the encoder. In some implementations, the rendered text and/or the user interface including the text may be lightly encoded. In that manner, the client device receives the rendered text and/or user interface including the text in high resolution, whereas if encoded normally, the rendered text and/or the user interface including the text would be encoded similarly as the rendered image of the scene and/or objects of the scene (i.e., at high compression resulting in low resolution).

At 270, during the text extraction mode implemented during periods of low connectivity, the method includes separately streaming to a client device the text and the encoded image of the scene or objects of the scene. That is, the rendered text and/or the user interface including the text is not encoded (or lightly encoded) and separately streamed to the client device. Also, the rendered image of the scene and/or objects of the scene that is encoded (i.e., highly compressed to low resolution) is separately streamed to the client device.

As such, the client device is configured to reconstruct the image frame using the rendered text and/or user interface including the text, and the rendered image of the scene and/or objects of the scene that are encoded. In particular, the encoded information is decoded to obtain the rendered image of the scene and/or objects of the scene (at low resolution) and the text (at high resolution) is overlaid onto the rendered image of the scene and/or objects of the scene for display at the client device.

In one embodiment, timing information (timestamp, an image frame identifier, etc.) is delivered with the data that is streamed. That is the timing information is included in the rendered image of the scene and/or objects of the scene that are encoded and streamed, and the timing information is also included in the text and/or user interface including the text that is streamed. In that manner, the client device is able to reconstruct the corresponding image frame using the proper rendered image of the scene and/or objects of the scene that is overlaid with the proper text and/or user interface including the text.

Figure 3:
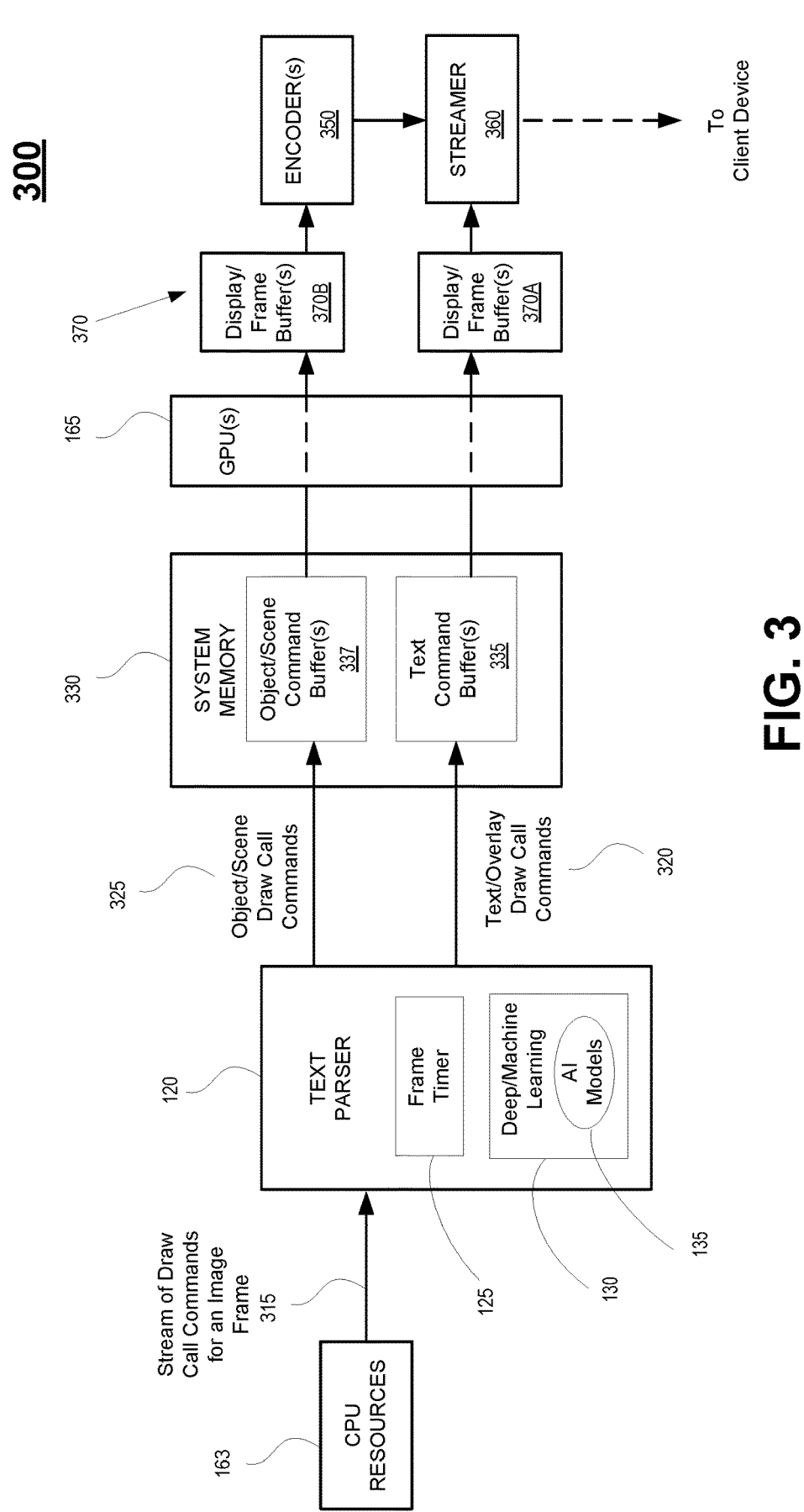
FIG. 3 is a diagram illustrating the extraction of text from a render pipeline to separate rendering and encoding processes for text and images of a scene including objects, in accordance with one embodiment of the disclosure.

FIG. 3 is a data flow diagram 300 illustrating the extraction of text from a render pipeline to separate rendering and encoding processes for text and images of a scene including objects, in accordance with one embodiment of the disclosure. The operations shown in data flow diagram 300 may be performed within the cloud game network 190 (e.g., game server 160, text parser 120, etc.) of FIG. 1 to implement the method of flow diagram 200 of FIG. 2 for the extraction of text from a render pipeline in order to separate the rendering of text and the rendering of an image (e.g., objects of a scene generated through execution of a video game) and the encoding of such during periods of low connectivity between the server and the corresponding client device.

As shown, CPU resources 163 are configured to generate a plurality of draw calls for execution by one or more GPUs to render one or more image frames. For example, an image frame may include an image including a scene and/or objects of a scene. The image frame may also include text and/or a user interface including the text, as previously described. The draw calls are stored into one or more command buffers as executed by one or more selected GPUs, each implementing a graphics pipeline, or the rendering pipeline. In particular, the CPU resources 163 execute a video game to generate one or more draw calls for an image frame. For example, a plurality of draw call commands 315 is output by the CPU resources 163. The draw calls include instructions and/or commands, for example, for execution by one or more corresponding GPUs implementing a graphics pipeline for rendering. For a particular image frame, there may be multiple draw calls that are generated by the CPU resources 163 and executed by the GPU resources 165. More particularly, as video games are designed to render ever more complex scenes, this requires pushing more and more draw calls for each image frame to generate a scene during game play.

In one embodiment, as the draw calls are generated by the CPU resources 163, the text parser 120 is configured to extract draw call commands directed to text and/or a user interface including the text from the draw call commands directed to the image of the scene and/or objects of the scene, as previously described. That is, the text parser 120 is configured to output text/overlay draw call commands 320 (i.e., used for rendering text and/or a user interface including the text) and object/scene draw call commands 325 (i.e., used for rendering an image of a scene and/or objects of the scene). In addition, the text parser may include a frame timer 125 providing timing information (e.g., timestamps, image frame identifiers, etc.) for use when reconstructing the various components of an image frame.

In some embodiment, the text parser 120 includes artificial intelligence (AI) to include a deep/machine learning engine 130 configured build or train and implement an AI model 135 for use in identifying draw calls or commands in the draw calls that are directed to text and/or user interfaces including text. In particular, the AI model 135 is configured to identify features in the draw calls (i.e., commands), and to further identify which of the draw calls contain features that are typically used when rendering text. More particularly, the AI model 135 is configured to identify the first set of commands that are used to render the text and/or the user interface including the text. In one embodiment, the AI learning model 135 is a machine learning model configured to apply machine learning to learn and identify which commands in draw calls are used to render text and/or user interfaces including the text. In another embodiment, the AI learning model is a deep learning model configured to apply deep learning to learn and identify which commands in draw calls are used to render text and/or user interfaces including the text, wherein machine learning is a sub-class of artificial intelligence, and deep learning is a sub-class of machine learning.

Purely for illustration, the deep/machine learning engine 190 may be configured as a neural network used to train and/or implement the AI model 135, in accordance with one embodiment of the disclosure. Generally, the neural network represents a network of interconnected nodes responding to input (e.g., extracted features) and generating an output (e.g., learn and identify which commands in draw calls are used to render text and/or user interfaces including the text). In one implementation, the AI neural network includes a hierarchy of nodes. For example, there may be an input layer of nodes, an output layer of nodes, and intermediate or hidden layers of nodes. Input nodes are interconnected to hidden nodes in the hidden layers, and hidden nodes are interconnected to output nodes. Interconnections between nodes may have numerical weights that may be used to link multiple nodes together between an input and output, such as when defining rules of the AI model 135.

For example, the AI model 135 can be configured to analyze the draw calls being output by the CPU resources 163, or analyze draw calls stored in command buffers that are set to a particular GPU, in order to produce one set of command buffers for rendering of text and/or a user interface including the text for an image frame, and to produce another set of command buffers for rendering of an image of a scene or objects of the scene in the image frame. That is, the draw calls for the text and/or user interface including the text are rendered on a separate pipeline than the draw calls for the image of a scene and/or objects on the scene.

For example, in one embodiment, the text extraction is performed at the kernel level in the operating system of the computing resource (e.g., game server). Draw calls to be stored in command buffers are intercepted, and draw calls directed to text, or user interface elements, and/or a user interface including the text and the other user interface elements are extracted. In one implementation, training of the AI model 135, in part using known draw calls directed to text over a wide array of implementations, allows for the identification of these draw calls directed to text and/or user interface elements. The AI model 135 can be checked for accuracy during training by taking a plurality of draw calls, and extracting the draw calls directed to text from the draw calls directed to the image of the scene in an image frame. After rendering, the rendered text can be superimposed over the rendered image of the scene, and compared to an original rendering of the plurality of draw calls without text extraction and stored in a command buffer that generates an original image frame.

As such, the text in video games and other user interface elements are rendered separately than the action provided in the successive images of a scene. That is, the image of the scene or objects of the scene are rendered separately from the text and/or the user interface including the text (i.e., user interface elements). Because there is a different game binary for rendering the image of game scenes and text on different rendering pipelines, not only can text be streamed at high resolution (i.e., without encoding) while the corresponding image of the game scene is encoded at high compression during periods of low connectivity, but the binary streaming of text and the image of the game scene can provide for more suitable AI analysis. That is, the AI analysis can focus directly on either the text or the image of the game scene.

System memory 330 may include a plurality of command buffers. Each command buffer is configured for the corresponding draw call commands. In particular, the CPU resources 163 and/or the text parser 120 writes commands of corresponding draw calls to corresponding command buffer (s) using a GPU API, wherein one or more command buffers may be used to render an image frame. Subsequent video frames are rendered using similarly configured command buffers. As shown, because of the extraction of draw calls directed to the rendering of text, the text/overlay draw calls 320 are stored in text command buffers 335 for executing by corresponding GPUs 340. For example, for an image frame, a first set of commands of draw calls may be stored in a corresponding text command buffer for execution by a GPU to render the text and/or the user interface including the text.

In addition, the object/scene draw calls 325 are stored in object/scene command buffers 337 for rendering by corresponding GPUs 340. As such, for the image frame, a second set of commands of draw calls may be stored in a corresponding image command buffer or object/scene command buffer for execution by a GPU to render the image of the scene and/or objects of the scene.

One or more GPUs 340, as scheduled by the CPU and/or text parser, or a GPU scheduler, may be implemented to render the image (e.g., scene and/or objects of the scene) and the text and/or the user interface including the text (e.g., user interface elements) of the corresponding image frame. As such, different rendering pipelines are used to separately render the text and/or the user interface including the text, and the image of the scene and/or the objects of the scene. In particular, each GPU 340 is configured for implementing a graphics pipeline. For example, a graphics pipeline may perform shader programs on vertices of objects within a scene to generate texture values for pixels of a display, wherein the operations are performed in parallel through a GPUs 340 for efficiency. In general, the graphics pipeline receives input geometries (e.g., vertices of objects within a gaming world). A vertex shader builds the polygons or primitives that make up the objects within a scene. The vertex shader or other shader programs may perform lighting, shading, shadowing and other operations for the polygons. The vertex shader or other shader programs may perform depth or z-buffering to determine which objects are visible in a scene that is rendered from a corresponding viewpoint. Rasterization is performed to project objects in the three dimensional world to a two-dimensional plane defined by the viewpoint. Pixel sized fragments are generated for the objects, wherein one or more fragments may contribute to the color of a corresponding pixel when displaying the image. The fragments are merged and/or blended to determine a combined color of each of the pixels, which are stored in a frame buffer for displaying.

The GPUs 340 output rendered data to display and/or frame buffers 370. In particular, because the rendering of text and the rendering of the image of a scene are performed on different rendering pipelines, the rendered text and/or the user interface including the text (e.g., user interface elements) are stored in display buffers 370A. Also the rendered image of the scene and/or objects of the scene are stored in display buffers 370B.

As shown, during periods of low connectivity, the encoder (s) 350 are implemented to encode the rendered image of the scene and/or objects of the scene using higher compression than normal. The rendered image of the scene and/or objects of the scene that is highly compressed (at low resolution) is delivered to the streamer 360 that manages streaming of data to the client device (not shown). In addition, the rendered text and/or the user interface including the text bypasses the encoder(s) 350, and is delivered directly to the streamer 360, such that the rendered text and/or the user interface including the text is streamed to the client device without any encoding. In one embodiment, the rendered text and/or the user interface including the text is lightly compressed, or the level of compression may be selected for optimum streaming during low periods of connectivity.

In one embodiment, the generation of an output image, graphics, and/or three-dimensional representation by an image generation AI (IGAI), can include one or more artificial intelligence processing engines and/or models. In general, an AI model is generated using training data from a data set. The data set selected for training can be custom curated for specific desired outputs and in some cases the training data set can include wide ranging generic data that can be consumed from a multitude of sources over the Internet. By way of example, an IGAI should have access to a vast of amount of data, e.g., images, videos and three-dimensional data. The generic data is used by the IGAI to gain understanding of the type of content desired by an input. For instance, if the input is requesting the generation of a tiger in the Sahara desert, the data set should have various images of tigers and deserts to access and draw upon during the processing of an output image. The curated data set, on the other hand, maybe be more specific to a type of content, e.g., video game related art, videos and other asset related content. Even more specifically, the curated data set could include images related to specific scenes of a game or actions sequences including game assets, e.g., unique avatar characters and the like. As described above, an IGAI can be customized to enable entry of unique descriptive language statements to set a style for the requested output images or content. The descriptive language statements can be text or other sensory input, e.g., inertial sensor data, input speed, emphasis statements, and other data that can be formed into an input request. The IGAI can also be provided images, videos, or sets of images to define the context of an input request. In one embodiment, the input can be text describing a desired output along with an image or images to convey the desired contextual scene being requested as the output.

In one embodiment, an IGAI is provided to enable text-to-image generation. Image generation is configured to implement latent diffusion processing, in a latent space, to synthesize the text to image processing. In one embodiment, a conditioning process assists in shaping the output toward the desired using output, e.g., using structured metadata. The structured metadata may include information gained from the user input to guide a machine learning model to denoise progressively in stages using cross-attention until the processed denoising is decoded back to a pixel space. In the decoding stage, upscaling is applied to achieve an image, video, or 3D asset that is of higher quality. The IGAI is therefore a custom tool that is engineered to processing specific types of input and render specific types of outputs. When the IGAI is customized, the machine learning and deep learning algorithms are tuned to achieve specific custom outputs, e.g., such as unique image assets to be used in gaming technology, specific game titles, and/or movies.

In another configuration, the IGAI can be a third-party processor, e.g., such as one provided by Stable Diffusion or others, such as OpenAI's GLIDE, DALL-E, MidJourney or Imagen. In some configurations, the IGAI can be used online via one or more Application Programming Interface (API) calls. It should be understood that reference to available IGAI is only for informational reference. For additional information related to IGAI technology, reference may be made to a paper published by Ludwig Maximilian University of Munich titled "*High-Resolution Image Synthesis with Latent Diffusion Models*", by Robin Rombach, et al., pp. 1-45. This paper is incorporated by reference.

Figure 4A:
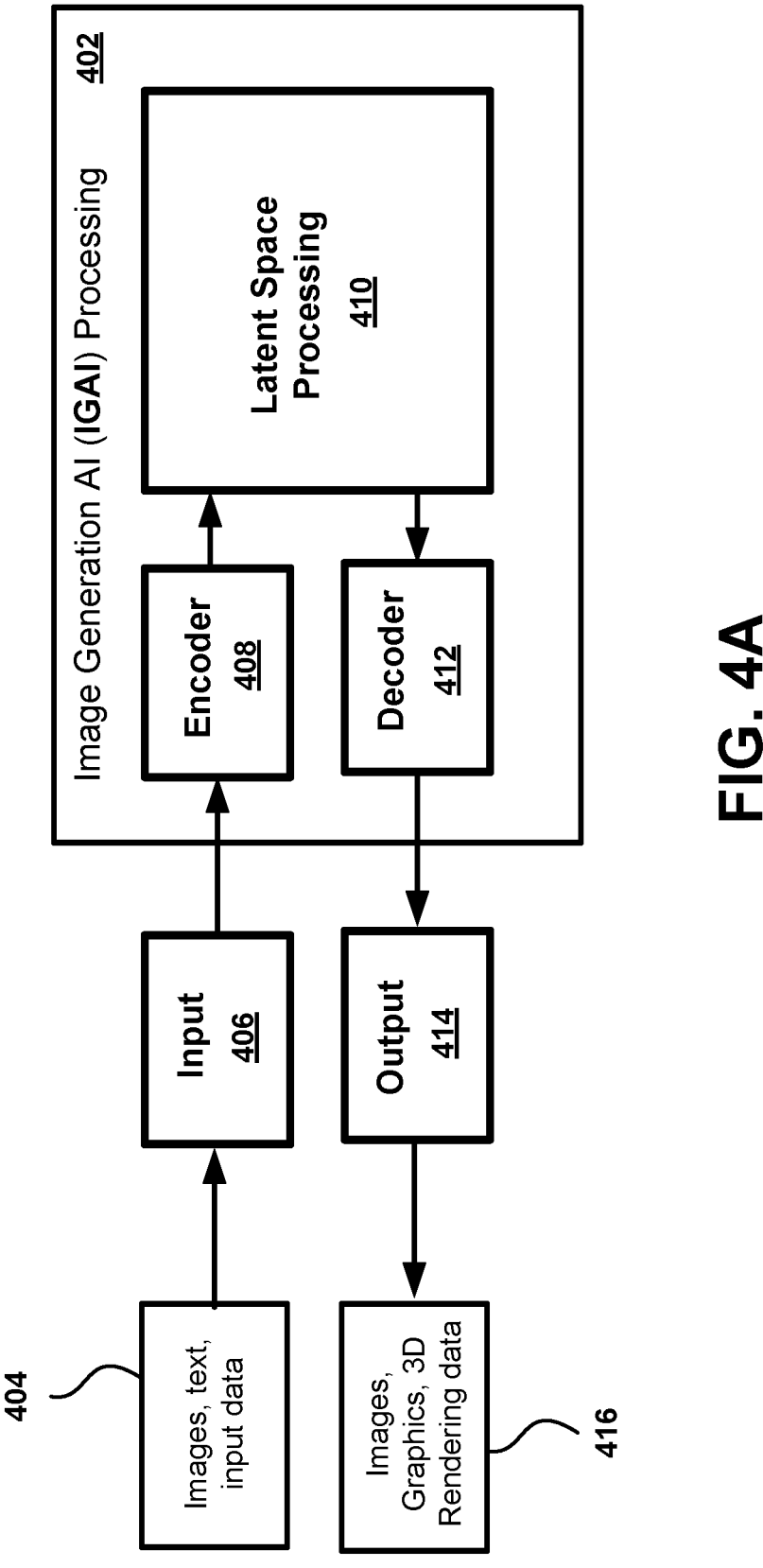
FIG. 4A is a general representation of an image generation AI (IGAI) processing sequence, in accordance with one embodiment.

FIG. 4A is a general representation of an image generation AI (IGAI) 402 processing sequence, in accordance with one embodiment. As shown, input 406 is configured to receive input in the form of data, e.g., text description having semantic description or key words. The text description can in the form of a sentence, e.g., having at least a noun and a verb. The text description can also be in the form of a fragment or simply one word. The text can also be in the form of multiple sentences, which describe a scene or some action or some characteristic. In some configuration, the input text can also be input in a specific order so as to influence the focus on one word over others or even deemphasize words, letters or statements. Still further, the text input can be in any form, including characters, emojis, ions, foreign language characters (e.g., Japanese, Chinese, Korean, etc.). In one embodiment, text description is enabled by contrastive learning. The basic idea is to embed both an image and text in a latent space so that text corresponding to an images maps to the same area in the latent space as the image. This abstracts out the structure of what it means to be a dog for instance from both the visual and textual representation. In one embodiment, a goal of contrastive representation learning is to learn an embedding space in which similar sample pairs stay close to each other while dissimilar ones are far apart. Contrastive learning can be applied to both supervised and unsupervised settings. When working with unsupervised data, contrastive learning is one of the most powerful approaches in self-supervised learning.

In addition to text, the input can also include other content, e.g., such as images or even images that have descriptive content themselves. Images can be interpreted using image analysis to identify objects, colors, intent, characteristics, shades, textures, three-dimensional representations, depth data, and combinations thereof. Broadly speaking, the input 406 is configured to convey the intent of the user that wishes to utilize the IGAI to generate some digital content. In the context of game technology, the target content to be generated can be a game asset for use in a specific game scene. In such a scenario, the data set used to train the IGAI and input 406 can be used to customized the way artificial intelligence, e.g., deep neural networks process the data to steer and tune the desired output image, data or three-dimensional digital asset.

The input 406 is then passed to the IGAI, where an encoder 408 takes input data and/or pixel space data and coverts into latent space data. The concept of "latent space" is at the core of deep learning, since feature data is reduced to simplified data representations for the purpose of finding patterns and using the patterns. The latent space processing 410 is therefore executed on compressed data, which significantly reduces the processing overhead as compared to processing learning algorithms in the pixel space, which is much more heavy and would require significantly more processing power and time to analyze and produce a desired image. The latent space is simply a representation of compressed data in which similar data points are closer together in space. In the latent space, the processing is configured to learn relationships between learned data points that a machine learning system has been able to derive from the information that it gets fed, e.g., the data set used to train the IGAI. In latent space processing 410, a diffusion process is computed using diffusion models. Latent diffusion models rely on autoencoders to learn lower-dimension representations of a pixel space. The latent representation is passed through the diffusion process to add noise at each step, e.g., multiple stages. Then, the output is fed into a denoising network based on a U-Net architecture that has cross-attention layers. A conditioning process is also applied to guide a machine learning model to remove noise and arrive at an image that represents closely to what was requested via user input. A decoder 412 then transforms a resulting output from the latent space back to the pixel space. The output 414 may then be processed to improve the resolution. The output 414 is then passed out as the result, which may be an image, graphics, 3D data, or data that can be rendered to a physical form or digital form.

Figure 4B:
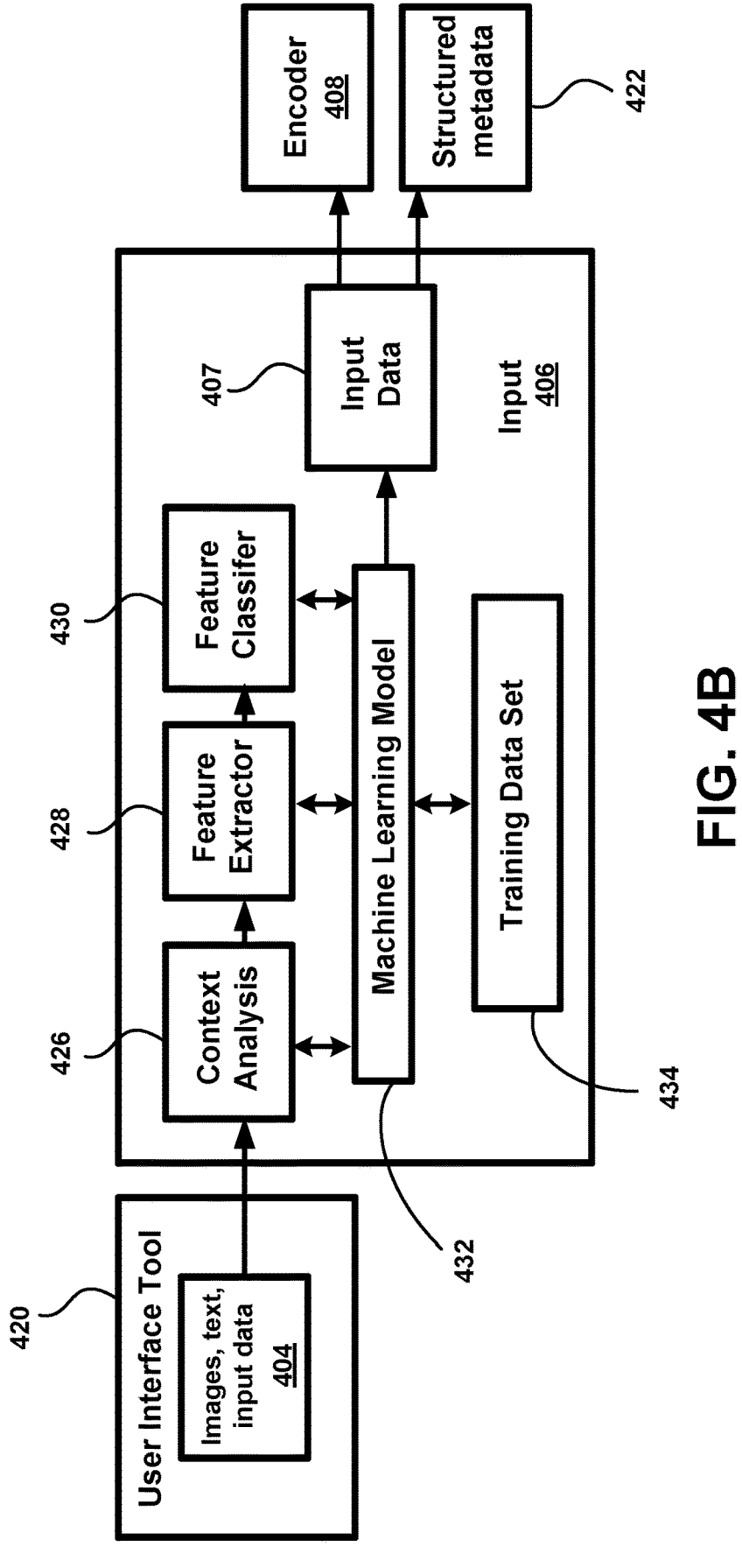
FIG. 4B illustrates additional processing that may be done to the input provided to the IGAI processing sequence described in FIG. 6A, in accordance with one embodiment of the present disclosure.

FIG. 4B illustrates, in one embodiment, additional processing that may be done to the input 406. A user interface tool 420 may be used to enable a user to provide an input request 404. The input request 404, as discussed above, may be images, text, structured text, or generally data. In one embodiment, before the input request is provided to the encoder 408, the input can be processed by a machine learning process that generates a machine learning model 432, and learns from a training data set 434. By way of example, the input data maybe be processed to via a context analyzer 426 to understand the context of the request. For example, if the input is "space rockets for flying to Mars", the input can be analyzed 426 to determine that the context is related to outer space and planets. The context analysis may use machine learning model 432 and training data set 434 to find related images for this context or identify specific libraries of art, images or video. If the input request also includes an image of a rocket, the feature extractor 428 can function to automatically identify feature characteristics in the rocket image, e.g., fuel tank, length, color, position, edges, lettering, flames, etc. A feature classifier 430 can also be used to classify the features and improve the machine learning model 432. In one embodiment, the input data 407 can be generated to produce structured information that can be encoded by encoder 408 into the latent space. Additionally, it is possible to extract out structured metadata 422 from the input request. The structed metadata 422 may be, for example, descriptive text used to instruct the IGAI 402 to make a modification to a characteristic or change to the input images or changes to colors, textures, or combinations thereof. For example, the input request 404 could include an image of the rocket, and the text can say "make the rocket wider" or "add more flames" or "make it stronger" or some other modifier intended by the user (e.g., semantically provided and context analyzed). The structured metadata 422 can then be used in subsequent latent space processing to tune the output to move toward the user's intent. In one embodiment, the structured metadata may be in the form of semantic maps, text, images, or data that is engineered to represent the user's intent as to what changes or modifications should be made an input image or content.

Figure 4C:
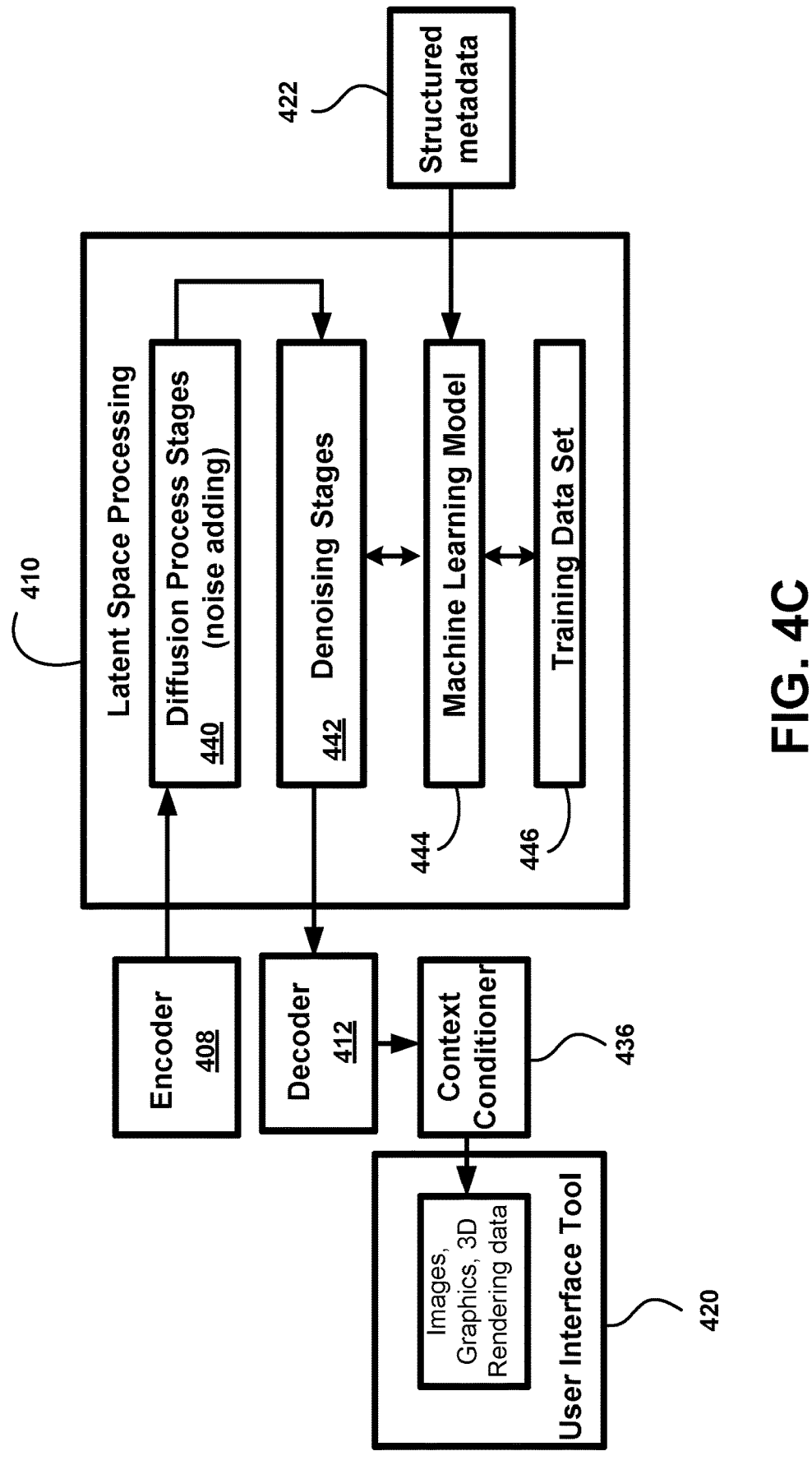
FIG. 4C illustrates how the output of the encoder used is then fed into latent space processing in the IGAI processing sequence, in accordance with one embodiment.

FIG. 4C illustrates how the output of the encoder 408 is then fed into latent space processing 410, in accordance with one embodiment. A diffusion process is executed by diffusion process stages 440, wherein the input is processed through a number of stages to add noise to the input image or images associated with the input text. This is a progressive process, where at each stage, e.g., 10-50 or more stages, noise is added. Next, a denoising process is executed through denoising stages 442. Similar to the noise stages, a reverse process is executed where noise is removed progressively at each stage, and at each stage, machine learning is used to predict what the output image or content should be, in light of the input request intent. In one embodiment, the structured metadata 422 can be used by a machine learning model 444 at each stage of denoising, to predict how the resulting denoised image should look and how it should be modified. During these predictions, the machine learning model 444 uses the training data set 446 and the structured metadata 422, to move closer and closer to an output that most resembles the requested in the input. In one embodiment, during the denoising, a U-Net architecture that has cross-attention layers may be used, to improve the predictions. After the final denoising stage, the output is provided to a decoder 412 that transforms that output to the pixel space. In one embodiment, the output is also upscaled to improve the resolution. The output of the decoder, in one embodiment, can be optionally run through a context conditioner 436. The context conditioner is a process that may use machine learning to examine the resulting output to make adjustments to make the output more realistic or remove unreal or unnatural outputs. For example, if the input asks for "a boy pushing a lawnmower" and the output shows a boy with three legs, then the context conditioner can make adjustments with in-painting processes or overlays to correct or block the inconsistent or undesired outputs. However, as the machine learning model 444 gets smarter with more training over time, there will be less need for a context conditioner 436 before the output is rendered in the user interface tool 420.

Figure 5:
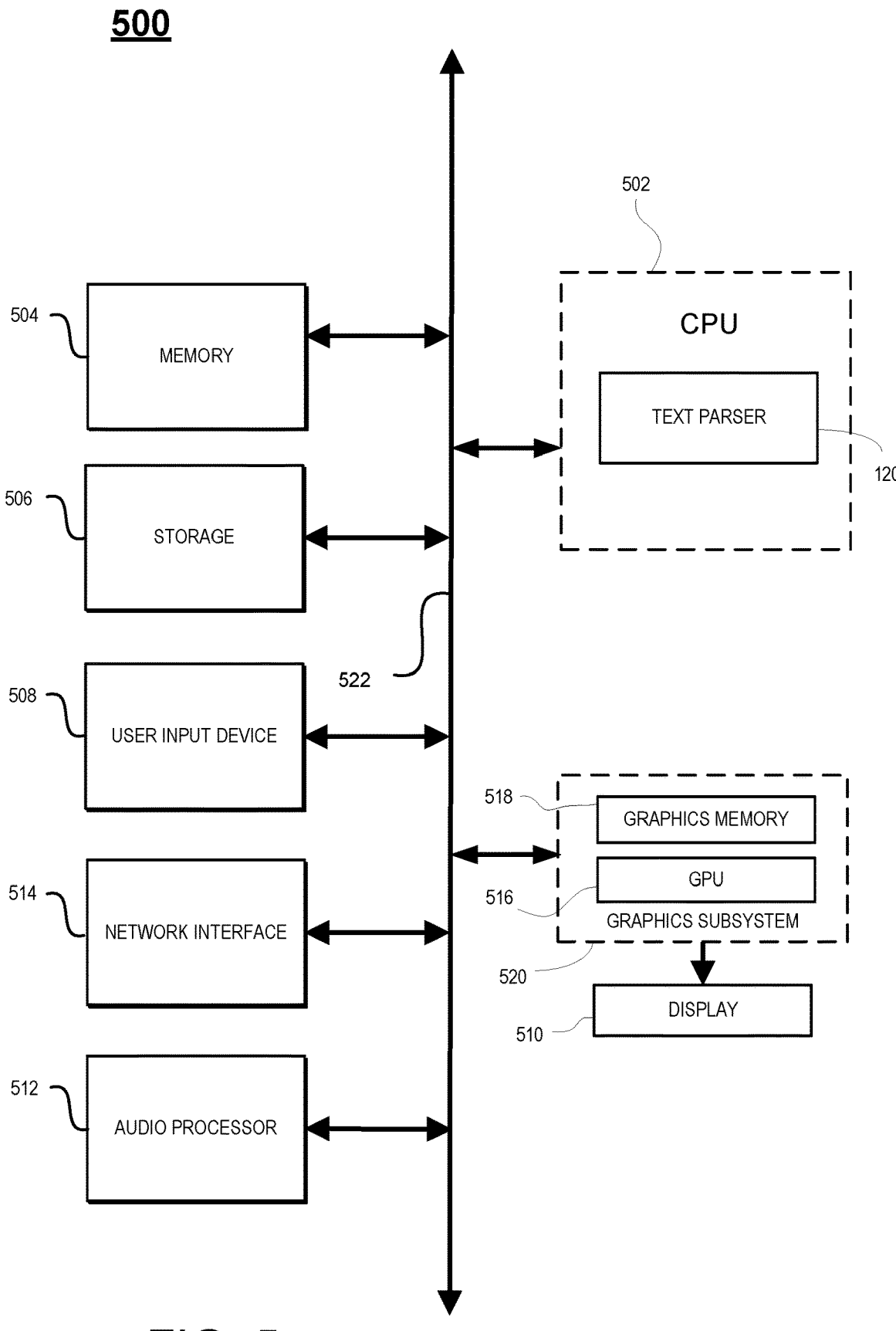
FIG. 5 illustrates components of an example device that can be used to perform aspects of the various embodiments of the present disclosure.

FIG. 5 illustrates components of an example device 500 that can be used to perform aspects of the various embodiments of the present disclosure. This block diagram illustrates a device 500 that can incorporate or can be a personal computer, video game console, personal digital assistant, a server or other digital device, suitable for practicing an embodiment of the disclosure. Device 500 includes a central processing unit (CPU) 502 for running software applications and optionally an operating system. CPU 502 may be comprised of one or more homogeneous or heterogeneous processing cores. For example, CPU 502 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 500 may be a localized to a player playing a game segment (e.g., game console), or remote from the player (e.g., back-end server processor), or one of many servers using virtualization in a game cloud system for remote streaming of gameplay to clients, or for implementing additional services such as a supervisor functionality.

In particular, CPU 502 may be configured to implement text parser 120 with functionality configured to extract text from a render pipeline to separate rendering and encoding processes for text (and/or user interface elements including a user interface including text) and images of a scene including objects, in accordance with one embodiment of the disclosure. Because the rendering of the image of a scene, or objects of a scene, and text and/or user interface including the text are performed on different rendering pipelines, the text and user interface elements can be streamed at high resolution (i.e., without compression) while the corresponding image of the scene and/or objects of the scene are encoded at high compression, such as during periods of low connectivity. In that manner, after reconstruction at the client device, while the rendered image of the scene may be delivered at low resolution after decoding (e.g., favoring smooth playback without skipped frames), the text and/or the user interface containing the text remains at high resolution allowing the user to fully receive and/or understand the information being conveyed through the text.

Memory 504 stores applications and data for use by the CPU 502. Storage 506 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 508 communicate user inputs from one or more users to device 500, examples of which may include keyboards, mice, joysticks, touch pads, touch screens, still or video recorders/cameras, tracking devices for recognizing gestures, and/or microphones. Network interface 514 allows device 500 to communicate with other computer systems via an electronic communications network, and may include wired or wireless communication over local area networks and wide area networks such as the internet. An audio processor 512 is adapted to generate analog or digital audio output from instructions and/or data provided by the CPU 502, memory 504, and/or storage 506. The components of device 500, including CPU 502, memory 504, data storage 506, user input devices 508, network interface 510, and audio processor 512 are connected via one or more data buses 522.

A graphics subsystem 520 is further connected with data bus 522 and the components of the device 500. The graphics subsystem 520 includes a graphics processing unit (GPU) 516 and graphics memory 518. Graphics memory 518 includes a display memory (e.g., a frame buffer) used for storing pixel data for each pixel of an output image. Graphics memory 518 can be integrated in the same device as GPU 516, connected as a separate device with GPU 516, and/or implemented within memory 504. Pixel data can be provided to graphics memory 518 directly from the CPU 502. Alternatively, CPU 502 provides the GPU 516 with data and/or instructions defining the desired output images, from which the GPU 516 generates the pixel data of one or more output images. The data and/or instructions defining the desired output images can be stored in memory 504 and/or graphics memory 518. In an embodiment, the GPU 516 includes 3D rendering capabilities for generating pixel data for output images from instructions and data defining the geometry, lighting, shading, texturing, motion, and/or camera parameters for a scene. The GPU 516 can further include one or more programmable execution units capable of executing shader programs. In one embodiment, GPU 516 may be implemented within an AI engine (e.g., machine learning engine 190) to provide additional processing power, such as for the AI, machine learning functionality, or deep learning functionality, etc.

The graphics subsystem 520 periodically outputs pixel data for an image from graphics memory 518 to be displayed on display device 510. Display device 510 can be any device capable of displaying visual information in response to a signal from the device 500, including CRT, LCD, plasma, and OLED displays. Device 500 can provide the display device 510 with an analog or digital signal, for example.

In other embodiments, the graphics subsystem 520 includes multiple GPU devices, which are combined to perform graphics processing for a single application that is executing on a corresponding CPU. For example, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g., if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g., a first shader operation) and compositing of outputs from slave GPU 2 and slave GPU 3, wherein slave GPU 2 could perform a second shader (e.g., fluid effects, such as a river) operation, the slave GPU 3 could perform a third shader (e.g., particle smoke) operation, wherein master GPU 1 composites the results from each of GPU 1, GPU 2, and GPU 3. In that manner, different GPUs can be assigned to perform different shader operations (e.g., flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, in various embodiments the present disclosure describes systems and methods configured for extracting text from a render pipeline to separate rendering and encoding processes for text (and/or user interface elements including a user interface including text) and images of a scene including objects, so that the text and user interface elements can be streamed at high resolution (i.e., without compression) while the corresponding image of the scene and/or objects of the scene are encoded at high compression, such as during periods of low connectivity.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

Access to the cloud gaming network by the client device may be achieved through a communication network implementing one or more communication technologies. In some embodiments, the network may include 5$^{th}$ Generation (5G) network technology having advanced wireless communication systems. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in the prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g., tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

One or more embodiments can also be fabricated as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising:

determining, based on a low-connectivity of a network, to encode a scene of an image frame independent of a text of the image frame rather than encoding the scene and the text together;

processing, using a machine learning model, the image frame to identify a first set of commands of one or more draw calls that are used to render the text in the image frame;

identifying a second set of commands of the one or more draw calls that are used to render the scene in the image frame based on the identification of the first set of commands of the one or more draw calls by the machine learning model;

executing the first set of commands to render the text separately from rendering the scene;

executing the second set of commands to render the scene independent of rendering the text;

encoding the scene that is rendered independent of the text, the text remaining unencoded; and separately streaming, via the network, to a client device the unencoded text and the encoded scene.

2. The method of claim 1, wherein the client device reconstructs the image frame by decoding the encoded scene to generate the scene that is rendered and overlaying the text onto the scene that is rendered.

3. The method of claim 2, further comprising:

including timing information with the scene that is rendered; and including the timing information with the text.

4. The method of claim 1, further comprising:

identifying when network connectivity between a server and the client device is below a quality of service (QoS) threshold.

5. The method of claim 1, further comprising:

streaming the text raw.

6. The method of claim 1, wherein the text is one of:

player status information; and closed-captioning; and player communication; and game generated text; and chat communication.

7. The method of claim 1, further comprising:

rendering a user interface associated with the text that is identified, wherein the first set of commands is used to render the user interface and the text in combination, wherein the user interface and the text in combination are streamed to the client device.

8. The method of claim 7, wherein the user interface includes one of:

a character status interface; and a thought bubble; and a chat forum.

9. The method of claim 1, further comprising:

applying an artificial intelligence (AI) model to identify the first set of commands that are used to render the text.

10. The method of claim 1, further comprising:

storing the first set of commands in a text command buffer for execution by a first GPU to render the text; and storing the second set of commands in an image command buffer by a second GPU to render the scene.

11. A non-transitory computer-readable medium storing a computer program for performing a method, the computer-readable medium comprising:

programming instructions for determining, based on a low-connectivity of a network, to encode a scene of an image frame independent of a text of the image frame rather than encoding the scene and the text together;

program instructions for processing, using a machine learning model, the image frame to identify a first set of commands of one or more draw calls that are used to render the text in the image frame;

program instructions for identifying a second set of commands of the one or more draw calls that are used to render the scene in the image frame based on the identification of the first set of commands of the one or more draw calls by the machine learning model;

program instructions for executing the first set of commands to render the text separately from rendering the scene;

program instructions for executing the second set of commands to render the scene independent of rendering the text;

program instructions for encoding the scene that is rendered independent of the text, the text remaining unencoded; and program instructions for separately streaming, via the network, to a client device the unencoded text and the encoded scene, wherein the client device reconstructs the image frame by decoding the encoded scene to generate the scene that is rendered and overlaying the unencoded text onto the scene that is rendered.

12. The non-transitory computer-readable medium of claim 11, further comprising:

program instructions for identifying when network connectivity between a server and the client device is below a quality of service (QoS) threshold.

13. The non-transitory computer-readable medium of claim 11, wherein in the method the text is one of:

player status information; and closed-captioning; and player communication; and game generated text; and chat communication.

14. The non-transitory computer-readable medium of claim 11, further comprising:

program instructions for rendering a user interface associated with the text that is identified, wherein the first set of commands is used to render the user interface and the text in combination, wherein the user interface and the text in combination are streamed to the client device.

15. The non-transitory computer-readable medium of claim 11, further comprising:

program instructions for storing the first set of commands in a text command buffer for execution by a first GPU to render the text; and program instructions for storing the second set of commands in an image command buffer by a second GPU to render the scene.

16. A computer system comprising:

a processor, memory coupled to the processor and having stored therein instructions that, if executed by the computer system, cause the computer system to execute a method, comprising:

determining, based on a low-connectivity of a network, to encode a scene of an image frame independent of a text of the image frame rather than encoding the scene and the text together;

processing, using a machine learning model, the image frame to identify a first set of commands of one or more draw calls that are used to render the text in the image frame;

identifying a second set of commands of the one or more draw calls that are used to render the scene in the image frame based on the identification of the first set of commands of the one or more draw calls by the machine learning model;

executing the first set of commands to render the text;

executing the second set of commands to render the scene independent of rendering the text;

encoding the scene that is rendered independent of the text, the text remaining unencoded; and separately streaming, via the network, to a client device the unencoded text and the encoded scene, wherein the client device reconstructs the image frame by decoding the encoded scene to generate the scene that is rendered and overlaying the unencoded text onto the scene that is rendered.

17. The computer system of claim 16, the method further comprising:

identifying when network connectivity between the server and the client device is below a quality of service (QoS) threshold.

18. The computer system of claim 16, wherein in the method the text is one of:

player status information; and closed-captioning; and player communication; and game generated text; and chat communication.

19. The computer system of claim 16, the method further comprising:

rendering a user interface associated with the text that is identified, wherein the first set of commands is used to render the user interface and the text in combination, wherein the user interface and the text in combination are streamed to the client device.

20. The computer system of claim 16, the method further comprising:

storing the first set of commands in a text command buffer for execution by a first GPU to render the text; and storing the second set of commands in an image command buffer by a second GPU to render the scene.

* * * * *